United States Patent
Kogo et al.

(10) Patent No.: US 9,617,938 B2
(45) Date of Patent: Apr. 11, 2017

(54) ABNORMALITY DIAGNOSIS APPARATUS OF EXHAUST GAS PURIFICATION APPARATUS

(71) Applicant: TOYOTA JIDOSHA KABUSHIKI KAISHA, Toyota-shi, Aichi (JP)

(72) Inventors: Tomoyuki Kogo, Gotenba (JP); Makoto Ogiso, Mishima (JP); Kazuya Takaoka, Susono (JP); Taiga Hagimoto, Nagaizumi-cho (JP); Arifumi Matsumoto, Gotenba (JP); Hirokazu Nishijima, Susono (JP); Kenji Furui, Susono (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

(21) Appl. No.: 14/893,735

(22) PCT Filed: May 29, 2014

(86) PCT No.: PCT/JP2014/064214
§ 371 (c)(1),
(2) Date: Nov. 24, 2015

(87) PCT Pub. No.: WO2014/192846
PCT Pub. Date: Dec. 4, 2014

(65) Prior Publication Data
US 2016/0131063 A1    May 12, 2016

(30) Foreign Application Priority Data

May 30, 2013    (JP) .................. 2013-113798

(51) Int. Cl.
*F02D 41/14*    (2006.01)
*F01N 11/00*    (2006.01)
(Continued)

(52) U.S. Cl.
CPC ......... *F02D 41/1461* (2013.01); *F01N 3/208* (2013.01); *F01N 11/00* (2013.01);
(Continued)

(58) Field of Classification Search
CPC ............ F02D 41/1461; F02D 41/0055; F02D 41/0235; F01N 3/208; F01N 2550/02;
(Continued)

(56) References Cited

U.S. PATENT DOCUMENTS

2009/0165758 A1* 7/2009 Nishiumi .............. F01N 3/0871
123/568.21
2011/0265463 A1   11/2011 Kojima et al.
(Continued)

FOREIGN PATENT DOCUMENTS

JP    2009068470 A  *  4/2009
JP    2010-159705         7/2010
(Continued)

*Primary Examiner* — Patrick Maines
(74) *Attorney, Agent, or Firm* — Finnegan, Henderson, Farabow, Garrett & Dunner, LLP (57) ABSTRACT

An abnormality diagnosis apparatus includes: an exhaust gas purification apparatus arranged in an exhaust passage of an internal combustion engine and including a selective catalytic reduction catalyst; a supply apparatus supplying an additive such as ammonia to the exhaust gas purification apparatus; an EGR apparatus recirculating a part of exhaust gas from the exhaust passage at a downstream side of a position of supplying the additive to an intake passage; calculating means for calculating a $NO_x$ inflow amount into the exhaust gas purification apparatus using a parameter indicating an operating state of the internal combustion engine; diagnosing means for diagnosing an abnormality in the exhaust gas purification apparatus using the calculated $NO_x$ inflow amount as a parameter; and correcting means for, when a part of the exhaust gas is recirculated, increas- (Continued)

ingly correcting the calculated NO$_x$ inflow amount in accordance with an amount of the additive to be recirculated together with exhaust gas.

4 Claims, 6 Drawing Sheets

(51) Int. Cl.
| | |
|---|---|
| *F01N 3/20* | (2006.01) |
| *F02D 41/00* | (2006.01) |
| *F02D 41/02* | (2006.01) |
| *F02M 26/06* | (2016.01) |
| *F02M 26/15* | (2016.01) |
| *F02D 41/22* | (2006.01) |
| *F02M 26/23* | (2016.01) |

(52) U.S. Cl.
CPC ........ *F01N 11/007* (2013.01); *F02D 41/0055* (2013.01); *F02D 41/0235* (2013.01); *F02D 41/1462* (2013.01); *F02D 41/1463* (2013.01); *F02M 26/06* (2016.02); *F02M 26/15* (2016.02); *F01N 2550/02* (2013.01); *F01N 2560/026* (2013.01); *F01N 2610/02* (2013.01); *F01N 2900/08* (2013.01); *F01N 2900/1402* (2013.01); *F02D 41/22* (2013.01); *F02D 2041/1469* (2013.01); *F02M 26/23* (2016.02); *Y02T 10/24* (2013.01); *Y02T 10/47* (2013.01)

(58) Field of Classification Search
CPC ............. F01N 2610/02; F01N 2900/08; F01N 2900/1402; Y02T 10/47
USPC .......................... 60/295, 301, 278, 285, 286
See application file for complete search history.

(56) References Cited

U.S. PATENT DOCUMENTS

| | | | |
|---|---|---|---|
| 2012/0124973 A1* | 5/2012 | Lee ..................... | F02D 41/0072 60/287 |
| 2012/0159934 A1 | 6/2012 | Itoh | |
| 2012/0240557 A1 | 9/2012 | Kawaguchi et al. | |
| 2014/0130483 A1* | 5/2014 | Miyake ................. | F02M 26/47 60/285 |
| 2014/0360163 A1* | 12/2014 | Kurtz .................. | F02D 41/0052 60/274 |
| 2016/0115851 A1* | 4/2016 | Kogo .................... | F01N 3/2066 60/276 |
| 2016/0131003 A1* | 5/2016 | Kogo ..................... | F01N 11/00 60/276 |

FOREIGN PATENT DOCUMENTS

| | | |
|---|---|---|
| WO | WO 2011/030433 A1 | 3/2011 |
| WO | WO 2011/070647 A1 | 6/2011 |
| WO | WO 2012/164713 A1 | 12/2012 |

\* cited by examiner

ABNORMALITY DIAGNOSIS APPARATUS OF EXHAUST GAS PURIFICATION APPARATUS

CROSS-REFERENCE TO RELATED APPLICATIONS

This application is a national phase application of International Application No. PCT/JP2014/064214, filed May 29, 2014, and claims the priority of Japanese Application No. 2013-113798, filed May 30, 2013, the content of both of which is incorporated herein by reference.

TECHNICAL FIELD

The present invention relates to an abnormality diagnosis technique for an exhaust gas purification apparatus provided in an exhaust passage of an internal combustion engine.

BACKGROUND ART

Patent Document 1 describes a configuration including a selective catalytic reduction (SCR) catalyst, an adding valve that adds a urea aqueous solution to exhaust gas flowing into the SCR catalyst, and a low pressure EGR (exhaust gas recirculation) system that guides a part of the exhaust gas (EGR gas) from an exhaust passage at a downstream side of the SCR catalyst to an intake passage.

Patent Document 2 describes a configuration including an SCR catalyst, an adding valve that adds a urea aqueous solution to exhaust gas flowing into the SCR catalyst, and a low pressure EGR system that guides a part of the exhaust gas from an exhaust passage at a downstream side of the SCR catalyst to an intake passage. Patent Document 2 also describes a technique for reducing an amount of EGR gas when adding a urea aqueous solution from the adding valve.

Patent Document 3 describes a configuration including an SCR catalyst, an adding valve that adds a urea aqueous solution to exhaust gas flowing into the SCR catalyst, and a low pressure EGR system that guides a part of the exhaust gas from an exhaust passage at a downstream side of the SCR catalyst to an intake passage. Patent Document 3 also describes a technique for supplying a urea aqueous solution from the adding valve while EGR gas is being recirculated when it is necessary to neutralize condensed water that is present in a pathway of low pressure EGR gas.

Patent Document 4 describes a configuration of a spark ignition internal combustion engine including an apparatus that supplies ammonia to an intake passage and an SCR catalyst arranged in an exhaust passage,

PRIOR ART REFERENCES

Patent Documents

Patent Document 1: WO 2012/164713
Patent Document 2: WO 2011/030433
Patent Document 3: WO 2011/070647
Patent Document 4: Japanese Patent Application Laid-open No. 2010-159705

SUMMARY OF THE INVENTION

Problems to be Solved by the Invention

As a technique for detecting an abnormality in an exhaust gas purification apparatus including an SCR catalyst and the like, a technique is known in which an amount of $NO_x$ that flows into the SCR catalyst (hereinafter, referred to as a "$NO_x$ inflow amount") and an amount of $NO_x$ flowing out from the SCR catalyst (hereinafter, referred to as a "$NO_x$ outflow amount") are used as parameters to calculate a $NO_x$ purification ratio (a proportion of an amount of $NO_x$ purified by the SCR catalyst with respect to the $NO_x$ inflow amount) of the SCR catalyst and an abnormality in the exhaust gas purification apparatus is diagnosed based on the $NO_x$ purification ratio.

While the $NO_x$ inflow amount and the $NO_x$ outflow amount may be calculated based on measurement values of a $NO_x$ sensor, since two $NO_x$ sensors are required, vehicle mountability may decline or manufacturing cost may increase. In consideration thereof, a method is proposed in which only a $NO_x$ outflow amount is calculated using a $NO_x$ sensor and a $NO_x$ inflow amount is estimated (calculated) based on an operating state of an internal combustion engine.

In a vehicle mounted with a low pressure EGR system as described in Patent Documents 1 to 3 above, an ammonia precursor such as a urea aqueous solution or ammonia may be introduced into the internal combustion engine by the low pressure EGR system. When an ammonia precursor or ammonia is burned in the internal combustion engine, $NO_x$ such as nitrogen monoxide (NO) is created. As a result, an amount of $NO_x$ discharged from the internal combustion engine or, in other words, a $NO_x$ inflow amount to the SCR catalyst increases. In such a case, a $NO_x$ inflow amount as calculated based on an operating state of the internal combustion engine becomes smaller than an actual $NO_x$ inflow amount. On the other hand, a $NO_x$ outflow amount as calculated based on a measurement value of a $NO_x$ sensor tends to exhibit not a little increase as the actual $NO_x$ inflow amount increases. Therefore, there is a possibility that a $NO_x$ purification ratio as calculated using a calculated value of the $NO_x$ inflow amount and a measured value of the $NO_x$ outflow amount as parameters may become smaller than an actual $NO_x$ purification ratio and an incorrect diagnosis that an abnormality in the exhaust gas purification apparatus has occurred may be made even though an abnormality in the exhaust gas purification apparatus has not occurred.

In consideration thereof, a method of prohibiting an abnormality diagnosis is conceivable when EGR gas is being recirculated. However, when an operating state in which EGR gas is recirculated continues, there is a possibility that an abnormality diagnosis may not be performed and an abnormality in the exhaust gas purification apparatus can no longer be detected in a prompt manner.

The present invention has been made in consideration of the various circumstances described above, and an object thereof is, with an abnormality diagnosis apparatus of an exhaust gas purification apparatus, the abnormality diagnosis apparatus including: an exhaust gas purification apparatus that includes a selective catalytic reduction catalyst; a supply apparatus that supplies ammonia or an additive which is an ammonia precursor to the exhaust gas purification apparatus; an EGR apparatus that guides a part of exhaust gas from an exhaust passage on a downstream side of a supply position of the additive to an intake passage; and diagnosing means that performs an abnormality diagnosis of the exhaust gas purification apparatus using a calculated value of a $NO_x$ inflow amount as a parameter, to prevent abnormality diagnostic accuracy from declining even when a part of an additive is introduced into an internal combustion engine by an EGR apparatus.

Means for Solving the Problems

In order to solve the problems described earlier, the present invention provides an abnormality diagnosis apparatus of an exhaust gas purification apparatus including: an exhaust gas purification apparatus which is arranged in an exhaust passage of an internal combustion engine and which includes a selective catalytic reduction catalyst; a supply apparatus which supplies an additive that is ammonia or an ammonia precursor to the exhaust gas purification apparatus; an EGR apparatus which recirculates a part of exhaust gas from the exhaust passage at a downstream side of a position of supplying the additive by the supply apparatus to an intake passage; calculating means for calculating a $NO_x$ inflow amount that is an amount of $NO_x$ that flows into the exhaust gas purification apparatus in use of a parameter indicating an operating state of the internal combustion engine; and diagnosing means for diagnosing an abnormality in the exhaust gas purification apparatus in use of the $NO_x$ inflow amount calculated by the calculating means as a parameter, wherein the $NO_x$ inflow amount calculated by the calculating means is corrected in accordance with an amount of the additive recirculated together with exhaust gas by the EGR apparatus.

Specifically, an abnormality diagnosis apparatus of an exhaust gas purification apparatus according to the present invention includes:

an exhaust gas purification apparatus which is arranged in an exhaust passage of an internal combustion engine and which includes a selective catalytic reduction catalyst;

a supply apparatus which supplies an additive that is ammonia or an ammonia precursor to the exhaust gas purification apparatus;

an EGR apparatus which recirculates a part of exhaust gas from the exhaust passage at a downstream side of a position of supplying the additive by the supply apparatus to an intake passage;

calculating means for calculating a $NO_x$ inflow amount that is an amount of $NO_x$ that flows into the exhaust gas purification apparatus in use of a parameter indicating an operating state of the internal combustion engine;

diagnosing means for diagnosing an abnormality in the exhaust gas purification apparatus using the $NO_x$ inflow amount calculated by the calculating means as a parameter; and correcting means for, when a part of the exhaust gas is recirculated by the EGR apparatus, increasingly correcting the $NO_x$ inflow amount calculated by the calculating means in accordance with an amount of the additive to be recirculated together with exhaust gas.

When a part of exhaust gas (EGR gas) is recirculated by an EGR apparatus, a part of an additive supplied from a supply apparatus may possibly be recirculated together with the EGR gas. In such a case, since the additive is burned in the internal combustion engine, an amount of $NO_x$ discharged from the internal combustion engine increases. Specifically, when the additive is burned together with an air-fuel mixture in the internal combustion engine, nitrogen monoxide (NO) is created as ammonia ($NH_3$) is oxidized. As a result, an amount of $NO_x$ actually discharged from the internal combustion engine (an amount of $NO_x$ that actually flows into the exhaust gas purification apparatus and hereinafter referred to as an "actual $NO_x$ inflow amount") becomes larger than a $NO_x$ inflow amount calculated by the calculating means (hereinafter, referred to as a "$NO_x$ inflow amount calculated value"). In other words, the $NO_x$ inflow amount calculated value becomes smaller than the actual $NO_x$ inflow amount. Therefore, when an abnormality diagnosis of the exhaust gas purification apparatus is performed using the $NO_x$ inflow amount calculated value as a parameter, diagnostic accuracy may possibly decline.

In contrast, when an abnormality diagnosis of the exhaust gas purification apparatus is performed in a state where EGR gas is burned in the internal combustion engine, the correcting means according to the present invention corrects the $NO_x$ inflow amount calculated value in accordance with an amount of the additive that is recirculated together with the EGR gas. Specifically, the correcting means according to the present invention increasingly corrects the $NO_x$ inflow amount calculated value such that the $NO_x$ inflow amount calculated value becomes larger when the amount of the additive recirculated together with EGR gas is large than when the amount of the additive recirculated together with EGR gas is small. When the $NO_x$ inflow amount calculated value is corrected in this manner, a difference between the $NO_x$ inflow amount calculated value and the actual $NO_x$ inflow amount decreases. Therefore, diagnostic accuracy can be prevented from declining when the diagnosing means performs an abnormality diagnosis of the exhaust gas purification apparatus using the $NO_x$ inflow amount calculated value after correction as a parameter.

In a case where the EGR apparatus is configured to recirculate EGR gas from the exhaust passage at a downstream side of the exhaust gas purification apparatus to the intake passage, an amount of the additive that is recirculated together with EGR gas must be accurately obtained in order to increase abnormality diagnostic accuracy of the exhaust gas purification apparatus. The amount of the additive that is recirculated together with the EGR gas can be calculated using an amount of the additive that slips through the exhaust gas purification apparatus (hereinafter, referred to as a "slip amount"), a proportion of an amount of exhaust gas recirculated as EGR gas with respect to an amount of exhaust gas flowed out from the exhaust gas purification apparatus (corresponding to an EGR ratio), and a period of time required by a part of exhaust gas flowed out from the exhaust gas purification apparatus to once again flow into the exhaust gas purification apparatus via the intake passage and the internal combustion engine (transport lag time) as parameters. In this case, approximately an entire amount of the additive that is recirculated together with the EGR gas is conceivably oxidized in the internal combustion engine. Therefore, an increment of the amount of $NO_x$ actually discharged from the internal combustion engine (a difference between the $NO_x$ inflow amount calculated value and the actual $NO_x$ inflow amount) correlates to a recirculation amount of the additive that is calculated using the parameters described above. In consideration thereof, the correcting means may correct the $NO_x$ inflow amount calculated value by a method involving calculating the recirculation amount of the additive using the parameters described above and adding the recirculation amount of the additive to the $NO_x$ inflow amount calculated value at a time point where the transport lag time has lapsed.

The slip amount of the additive can be calculated by using a temperature of the selective catalytic reduction catalyst, a flow rate of exhaust gas flowing through the selective catalytic reduction catalyst, and an amount of ammonia adsorbed by the selective catalytic reduction catalyst as parameters. For example, the slip amount of the additive when a temperature of the selective catalytic reduction catalyst is high is larger than when the temperature of the selective catalytic reduction catalyst is low. The slip amount of the additive when the flow rate of exhaust gas flowing through the selective catalytic reduction catalyst is large is larger than when the flow rate of exhaust gas flowing through the selective catalytic reduction catalyst is small. The slip amount of the additive when the amount of ammonia adsorbed by the selective catalytic reduction catalyst is large is larger than when the amount of ammonia adsorbed by the selective catalytic reduction catalyst is small. In consideration thereof, based on these tendencies, a map or a function representing a relationship among the temperature of the selective catalytic reduction catalyst, the flow rate of exhaust gas flowing through the selective catalytic reduction catalyst, the amount of ammonia adsorbed by the selective catalytic reduction catalyst, and the slip amount of the additive may be obtained in advance and the slip amount of the additive may be obtained based on the map or the function.

In addition, the transport lag time can be calculated using a length of a pathway traveled by a part of exhaust gas having flowed out from the exhaust gas purification apparatus until once again flowing into the exhaust gas purification apparatus via the EGR passage, the intake passage, and the internal combustion engine, a capacity of the pathway, and a flow speed of exhaust gas (correlates to an intake air amount per unit time) as parameters. For example, the longer the length of the pathway, the longer the transport lag time. The larger the capacity of the pathway, the longer the transport lag time. The slower the flow speed of exhaust gas, the longer the transport lag time. Moreover, since the length of the pathway and the capacity of the pathway are fixed values, a map or a function representing a relationship between the flow speed of exhaust gas and the transport lag time may be obtained in advance and the transport lag time may be obtained based on the map or the function.

When the recirculation amount of the reducing agent and the transport lag time are obtained by a method such as that described above, the correcting means may correct the $NO_x$ inflow amount calculated value by adding the recirculation amount of the additive to the $NO_x$ inflow amount calculated value at a time point where the transport lag time has lapsed. In addition, the diagnosing means may diagnose an abnormality in the exhaust gas purification apparatus based on the $NO_x$ inflow amount calculated value after correction. As a result, abnormality diagnostic accuracy can be prevented from declining even when a part of the additive is introduced into the internal combustion engine by the EGR apparatus.

Next, in a case where the EGR apparatus is configured to recirculate EGR gas from the exhaust passage at a downstream side of a supply position of the additive and at an upstream side of the exhaust gas purification apparatus to the intake passage, a recirculation amount of the additive can be calculated using the EGR ratio and the transport lag time as parameters. In consideration thereof, the correcting means may calculate the recirculation amount of the additive using the EGR ratio and the transport lag time as parameters and correct the $NO_x$ inflow amount calculated by the calculating means in accordance with a calculation result thereof.

The abnormality diagnosis apparatus of an exhaust gas purification apparatus according to the present invention may further include changing means for changing an amount of the additive that is supplied from the supply apparatus in accordance with a correction amount when the correcting means increasingly corrects the $NO_x$ inflow amount calculated value. In this case, the amount of the additive that is supplied from the supply apparatus is an amount in accordance with the actual $NO_x$ inflow amount. As a result, an amount of $NO_x$ not purified by the exhaust gas purification apparatus can be reduced.

Effect of the Invention

According to the present invention, in an abnormality diagnosis apparatus of an exhaust gas purification apparatus, the abnormality diagnosis apparatus including: an exhaust gas purification apparatus that includes a selective catalytic reduction catalyst; a supply apparatus that supplies an additive which is ammonia or an ammonia precursor to the exhaust gas purification apparatus; an EGR apparatus that guides a part of exhaust gas from an exhaust passage at a downstream side of a supply position of the additive to an intake passage; and diagnosing means that performs an abnormality diagnosis of the exhaust gas purification apparatus using a calculated value of a $NO_x$ inflow amount as a parameter, abnormality diagnostic accuracy can be prevented from declining even when a part of the additive is introduced into the internal combustion engine by the EGR apparatus.

MODES FOR CARRYING OUT THE INVENTION

Hereinafter, a specific embodiment of the present invention will be described with reference to the drawings. It is to be understood that dimensions, materials, shapes, relative arrangements, and the like of components described, in the present embodiment are not intended to limit the technical scope of the invention thereto unless otherwise noted.

Figure 1:
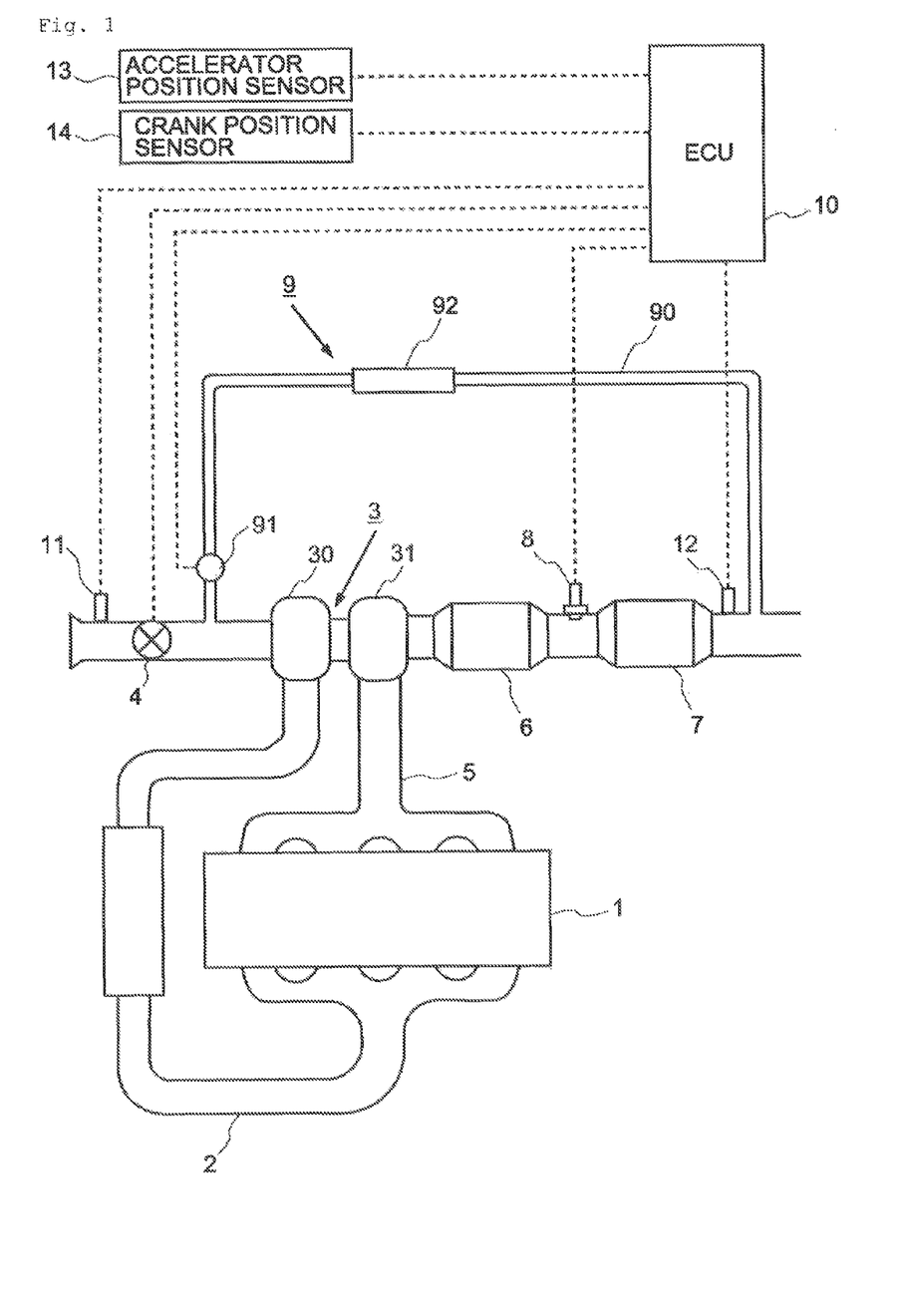
FIG. 1 is a diagram showing a schematic configuration of an internal combustion engine and an intake and exhaust system thereof to which the present invention is applied.

FIG. 1 is a diagram, showing a schematic configuration of an internal combustion engine and an intake and exhaust system thereof to which the present invention is applied. An internal combustion engine 1 shown in FIG. 1 is a compression ignition internal combustion engine (diesel engine) that uses light oil as a main fuel or a spark ignition internal combustion engine (gasoline engine) that uses gasoline as a main fuel.

An intake passage 2 is connected to the internal combustion engine 1. The intake passage 2 is a passage for guiding fresh air (air) taken in from the atmosphere to the internal combustion engine 1. A compressor 30 of a centrifugal supercharger (turbocharger) 3 is arranged at intermediate of the intake passage 2. An intake throttle valve 4 that changes a passage sectional area of the intake passage 2 is arranged in the intake passage 2 at an upstream side of the compressor 30.

An exhaust passage 5 is connected to the internal combustion engine 1. The exhaust passage 5 is a passage for guiding gas (exhaust gas) burned inside a cylinder of the internal combustion engine 1 to an exhaust gas purification apparatus and the like. A turbine 31 of the turbocharger 3 is arranged at the intermediate of the exhaust passage 5. A first catalyst casing 6 is arranged in the exhaust passage 5 at a downstream side of the turbine 31.

The first catalyst casing 6 houses a particulate filter, an oxidation catalyst, and the like inside a cylindrical casing. Moreover, the first catalyst casing 6 may house a three-way catalyst or an occlusive reduction catalyst instead of the oxidation catalyst. In this case, the three-way catalyst or the occlusive reduction catalyst may be carried by the particulate filter.

A second catalyst casing 7 is arranged in the exhaust passage 5 at a downstream side of the first catalyst casing 6. The second catalyst casing 7 houses a selective catalytic reduction catalyst (SCR catalyst), an oxidation catalyst, or the like inside a cylindrical casing. Moreover, the second catalyst casing 7 may house a particulate filter carrying an SCR catalyst. In this case, the first catalyst casing 6 may house an oxidation catalyst or, alternatively, the oxidation catalyst may be housed inside the second catalyst casing 7 without providing the first catalyst casing 6. The second catalyst casing 7 configured in this manner corresponds to the exhaust gas purification apparatus according to the present invention.

An adding valve 8 is attached to the exhaust passage 5 between the first catalyst casing 6 and the second catalyst casing 7. The adding valve 8 is an injection valve for injecting ammonia or an additive that is an ammonia precursor into the exhaust passage 5. In this case, an aqueous solution of urea, ammonium carbamate, or the like can be used as the ammonia precursor, but a urea aqueous solution is used in the present embodiment. The adding valve 8 corresponds to the supply apparatus according to the present invention. Moreover, when the first catalyst casing 6 houses a three-way catalyst or an occlusive reduction catalyst, by making exhaust gas that flows into the first catalyst casing 6 a rich atmosphere, ammonia can also be created at the three-way catalyst or the occlusive reduction catalyst.

The urea aqueous solution injected from the adding valve 8 into the exhaust passage 5 flows into the second catalyst casing 7 together with exhaust gas. At this point, the urea aqueous solution is pyrolyzed by the heat of the exhaust gas or hydrolyzed by the SCR catalyst. When the urea aqueous solution is pyrolyzed or hydrolyzed, ammonia (NH3) is created. Ammonia ($NH_3$) created in this manner is adsorbed or stored by the SCR catalyst. The ammonia ($NH_3$) adsorbed or stored by the SCR catalyst reacts with nitrogen oxides ($NO_x$) contained in the exhaust gas and creates nitrogen ($N_2$) and water ($H_2O$). In other words, ammonia ($NH_3$) functions as a reducing agent of nitrogen oxides ($NO_x$).

Next, a base end of an EGR passage 90 is connected to the exhaust passage 5 on a downstream side of the second catalyst casing 7. A terminal end of the EGR passage 90 is connected to the intake passage 2 at a downstream side of the intake throttle valve 4 and at an upstream side of the compressor 30. The EGR passage 90 is a passage for guiding a part of exhaust gas (EGR gas) from the exhaust passage 5 to the intake passage 2.

An EGR valve 91 and an EGR cooler 92 are arranged midway along the EGR passage 90. The EGR valve 91 is a valve mechanism which changes a passage sectional area of the EGR passage 90 and which adjusts an EGR gas amount that flows through the EGR passage 90. The EGR cooler 92 is a device that cools EGR gas flowing through the EGR passage 90 and may be, for example, a heat exchanger that causes heat to be exchanged between the EGR gas and cooling water. Moreover, the EGR passage 90, the EGR valve 91, and the EGR cooler 92 are elements constituting an EGR apparatus 9.

An ECU 10 is annexed to the internal combustion engine 1 configured as described above. The ECU 10 is an electronic control unit constituted by a CPU, a ROM, a RAM, a backup RAM, and the like. The ECU 10 is electrically connected to various sensors including an air flow meter 11, a $NO_x$ sensor 12, an accelerator position sensor 13, and a crank position sensor 14.

The air flow meter 11 is arranged in the intake passage 2 at an upstream side of the intake throttle valve 4 and outputs an electric signal correlated to an amount (mass) of air that flows through the intake passage 2. The $NO_x$ sensor 12 is attached to the exhaust passage 5 at a downstream side of the second catalyst casing 7 and outputs an electric signal correlated to a $NO_x$ concentration in exhaust gas that flows out from the second catalyst casing 7. The accelerator position sensor 13 outputs an electric signal correlated to an operation amount (accelerator depression amount) of an accelerator pedal (not shown). The crank position sensor 14 outputs an electric signal correlated to a rotational, position of an output shaft (crankshaft) of the internal combustion engine 1.

Furthermore, in addition to the intake throttle valve 4, the adding valve 3, and the EGR valve 91 described above, the ECU 10 is electrically connected to various devices such as a fuel injection valve (not shown). The ECU 10 electrically controls the various devices described above based on output signals of the various sensors described above.

For example, the ECU 10 calculates an engine load or an engine rotational speed based on output signals from the accelerator position sensor 13 and the crank position sensor 14 and controls a fuel injection amount or a fuel injection timing in accordance with a calculation result thereof. In addition, the ECU 10 diagnoses an abnormality of the SCR catalyst, using an amount of $NO_x$ that flows into the SCR catalyst ($NO_x$ inflow amount) housed in the second catalyst casing 7 as a parameter.

An abnormality diagnosing method of the SCR catalyst will now be described. First, the ECU 10 calculates an amount of $NO_x$ discharged from the internal combustion engine 1 (in other words, an amount of $NO_x$ that flows into the SCR catalyst of the second catalyst casing 7 ($NO_x$ inflow amount)) based on a parameter indicating an operating state of the internal combustion engine 1.

An amount of $NO_x$ discharged from the internal combustion engine 1 or, in other words, an amount of $NO_x$ generated when an air-fuel mixture is burned in the internal combustion engine 1 is correlated, with an amount of oxygen contained in the air-fuel mixture, an amount of fuel contained in the air-fuel mixture, a fuel injection timing, and an engine rotational speed. The amount of oxygen contained in the air-fuel mixture is correlated with an intake air amount (an output signal of the air flow meter 11). The amount of fuel contained in the air-fuel mixture is correlated with a fuel injection amount. Therefore, the ECU 10 can calculate a $NO_x$ inflow amount using an output signal of the air flow meter 11, a fuel injection amount, a fuel injection timing, and an engine rotational speed as parameters. Moreover, relationships among the various parameters described above and a $NO_x$ inflow amount may be empirically obtained and stored in a ROM of the ECU 10 in advance in the form of a map or a functional expression. The acquiring means according to the present invention is realized as the ECU 10 calculates a $NO_x$ inflow amount as described above.

The ECU 10 diagnoses an abnormality of an SCR catalyst using a calculated value of a $NO_x$ inflow amount ($NO_x$ inflow amount calculated value) as a parameter. As a method of diagnosing an abnormality of an SCR catalyst using a $NO_x$ inflow amount calculated value as a parameter, for example, a method in which a $NO_x$ purification ratio, a $NO_x$ purification amount, or the like is calculated using a $NO_x$ inflow amount calculated value as a parameter and a calculation result thereof is compared with a threshold can be used. Hereinafter, an example will be described in which a $NO_x$ purification ratio and a threshold are compared with each other. The $NO_x$ purification ratio in this case refers to a proportion of an amount of $NO_x$ purified by the SCR catalyst with respect to an amount of $NO_x$ that flows into the SCR catalyst and can be calculated by Expression (1) below.

$$Enox=(Anoxin-Anoxout)/Anoxin \qquad (1)$$

In Expression (1) above, Enox denotes a $NO_x$ purification ratio. Anoxin denotes a $NO_x$ inflow amount, and the $NO_x$ inflow amount calculated value calculated by the method described above is stored in Anoxin. Anoxout denotes a $NO_x$ outflow amount, and a value obtained by multiplying an output signal ($NO_x$ concentration) of the $NO_x$ sensor 12 by an exhaust flow rate per unit time (a sum of an intake air amount per a unit time and a fuel injection amount per unit time) is stored in Anoxout.

Once the $NO_x$ purification ratio Enox is calculated with Expression (1) above, the ECU 10 determines whether or not the $NO_x$ purification ratio Enox is equal to or higher than a threshold. The "threshold" in this case refers to a minimum $NO_x$ purification ratio or a value obtained by adding a margin to the minimum $NO_x$ purification ratio when an abnormality of the SCR catalyst has not occurred. The ECU 10 determines that an abnormality of the SCR catalyst has not occurred when the $NO_x$ purification ratio Enox is equal to or higher than the threshold. On the other hand, a determination that an abnormality of the SCR catalyst has occurred is made when the $NO_x$ purification ratio Enox is lower than the threshold. The diagnosing means according to the present invention is realized as the ECU 10 executes processing of an abnormality diagnosis of the SCR catalyst as described above, using a calculated value of a $NO_x$ inflow amount as a parameter.

When processing of an abnormality diagnosis of the SCR catalyst is performed during recirculation of a part of exhaust gas to the intake passage 2 from the exhaust passage 5 by the EGR apparatus 9 or, more specifically, during a reflow of a part of exhaust gas (EGR gas) recirculated by the EGR apparatus 9 into the SCR catalyst, there is a possibility that an incorrect diagnosis will be made.

When a part of ammonia slips through the SCR catalyst as the EGR gas is being recirculated, a part of the ammonia is sucked into the internal combustion engine 1 together with the EGR gas. The ammonia sucked into the internal combustion engine 1 is burned together with an air-fuel mixture. In this case, since ammonia comes into contact with oxygen under a high temperature, the ammonia is oxidized and $NO_x$ such as nitrogen monoxide (NO) is created. As a result, when ammonia is sucked into the internal combustion engine 1 together with EGR gas, an amount of $NO_x$ discharged from the internal combustion engine 1 increases as compared to when ammonia is not sucked into the internal combustion engine 1.

Figure 2:
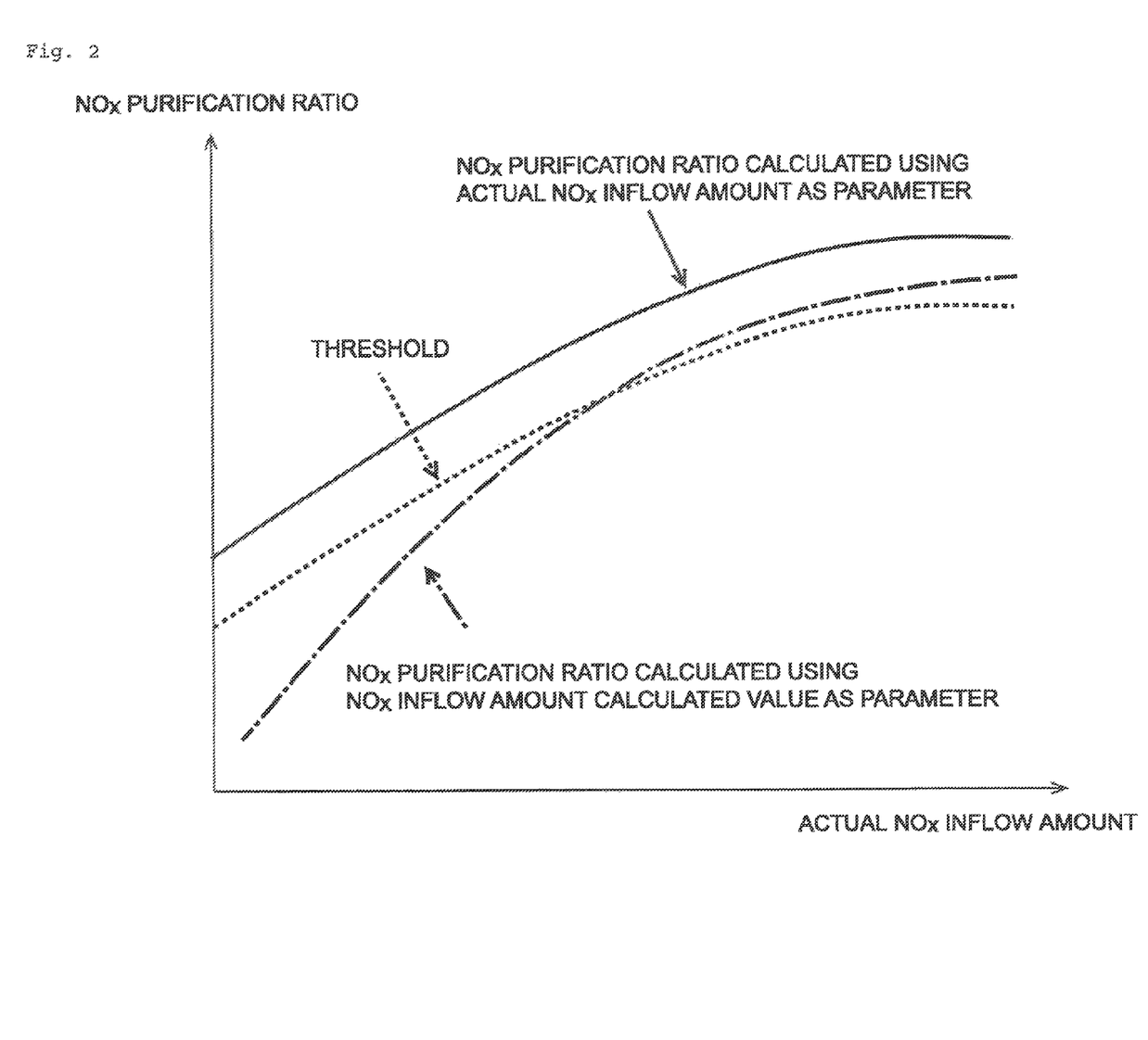
FIG. 2 is a diagram showing a relationship between an actual $NO_x$ inflow amount and a $NO_x$ purification ratio.

When the amount of $NO_x$ discharged from the internal combustion engine 1 increases due to the reason described above, an error occurs between the $NO_x$ inflow amount calculated value and an actual $NO_x$ inflow amount. In addition, when the actual $NO_x$ inflow amount increases, an amount of $NO_x$ not purified by the SCR catalyst may increase and a $NO_x$ outflow amount may increase. In particular, when an amount of a urea aqueous solution injected from the adding valve 8 is adjusted based on the $NO_x$ inflow amount calculated value, since the amount of urea aqueous solution injected from the adding valve 8 becomes smaller than an amount suitable for the actual $NO_x$ inflow amount, the $NO_x$ outflow amount increases. As a result, as shown in FIG. 2, even when an abnormality of the SCR catalyst has not occurred, the $NO_x$ purification ratio Enox as calculated with Expression (1) above may fall below the threshold. Moreover, a solid line in FIG. 2 indicates a $NO_x$ purification ratio as calculated using the actual $NO_x$ inflow amount as a parameter and an one-dot chain line in FIG. 2 indicates a $NO_x$ purification ratio as calculated using the $NO_x$ inflow amount calculated value as a parameter. In addition, a dotted line in FIG. 2 indicates the threshold.

In addition, in the method of comparing a $NO_x$ purification amount of the SCR catalyst with a threshold, the $NO_x$ purification amount of the SCR catalyst can be calculated by subtracting the $NO_x$ outflow amount from the $NO_x$ inflow amount calculated value. In this case, when the $NO_x$ inflow amount calculated value is smaller than the actual $NO_x$ inflow amount, a calculated value of the $NO_x$ purification amount becomes smaller than the actual $NO_x$ purification amount. As a result, the calculated value of the $NO_x$ purification amount may possibly fall below the threshold.

In consideration thereof, the abnormality diagnosis apparatus of an exhaust gas purification apparatus according to the present, embodiment is configured such that, when an abnormality diagnosis of an SCR catalyst is performed in a state where EGR gas is being recirculated, a $NO_x$ inflow amount calculated value is corrected in accordance with an amount of ammonia sucked into the internal combustion engine 1 together with the EGR gas, a $NO_x$ purification ratio is calculated using the $NO_x$ inflow amount calculated value after correction, and an injection amount of a urea aqueous solution is determined using the $NO_x$ inflow amount calculated, value after correction.

Figure 3:
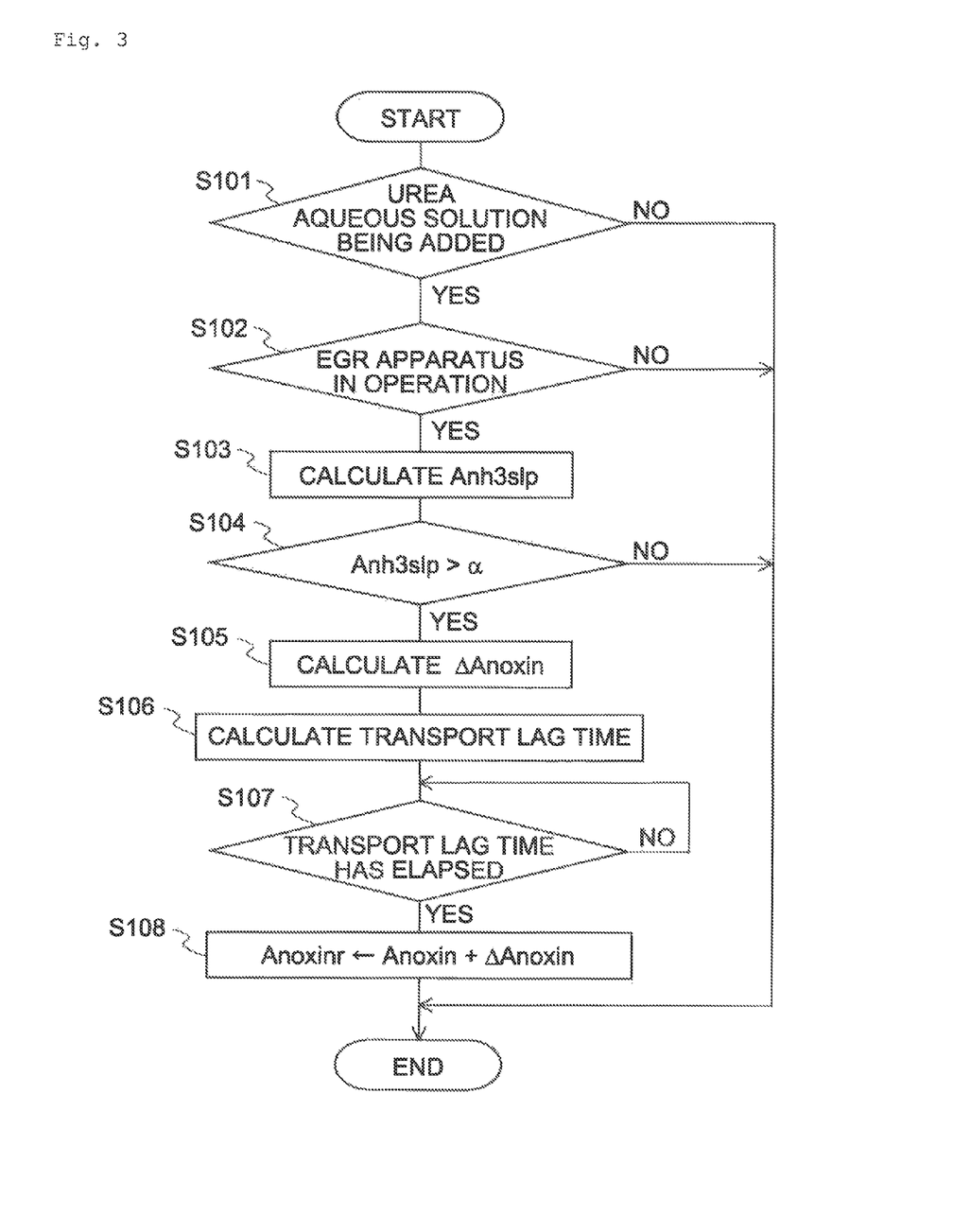
FIG. 3 is a flow chart showing a processing routine executed by an ECU when correcting a calculated value of a $NO_x$ inflow amount.

A procedure for correcting a $NO_x$ inflow amount calculated value will now be described with reference to FIG. 3. FIG. 3 is a flow chart showing a processing routine that is executed by the ECU 10 when correcting a $NO_x$ inflow amount calculated value Anoxin. This processing routine is stored in the ROM of the ECU 10 in advance and is periodically executed by the ECU 10 (CPU).

In the processing routine shown in FIG. 3, first, in a process of S101, the ECU 10 determines whether or not the adding valve 8 is injecting a urea, aqueous solution. When a negative determination is made in a process of S101, since ammonia is not sucked into the internal combustion engine 1 together with EGR gas or, even when some ammonia is desorbed from the SCR catalyst, since an amount of ammonia that is sucked into the internal combustion engine 1 together with EGR gas is small, the ECU 10 terminates execution of the present routine without correcting the $NO_x$ inflow amount calculated value Anoxin. On the other hand, when a positive determination is made in the process of S101, the ECU 10 proceeds to a process of S102.

In the process of S102, the ECU 10 determines whether or not the EGR apparatus 9 is operating or, in other words, whether or not a part of exhaust gas is being recirculated from the exhaust passage 5 to the intake passage 2 by the EGR apparatus 9. The ECU 10 makes a negative determination when an opening amount of the EGR valve 91 is zero (fully closed) and makes a positive determination when the opening amount of the EGR valve 91 is larger than zero. When a negative determination is made in a process of S102, since ammonia having slipped through the SCR catalyst is not sucked into the internal combustion engine 1, the ECU 10 terminates execution of the present routine.

Moreover, when a negative determination is made in the process of S101 and when negative in the process of S102, the ECU 10 executes an abnormality diagnosing process of the exhaust gas purification apparatus and injection amount control of the urea aqueous solution based on the uncorrected $NO_x$ inflow amount calculated value.

When a positive determination is made in the process of S102, ammonia having slipped through the SCR catalyst may be sucked into the internal combustion engine 1. Therefore, the ECU 10 corrects the $NO_x$ inflow amount calculated value in the processes of S103 and thereafter.

First, in a process of S103, the ECU 10 calculates an amount of ammonia that flows out from the SCR catalyst or, in other words, an ammonia slip amount Anh3slp. In this case, the ammonia slip amount Anh3slp is calculated using a flow rate of exhaust gas, a temperature of the SCR catalyst, and an ammonia adsorption amount of the SCR catalyst as parameters.

Figure 4:
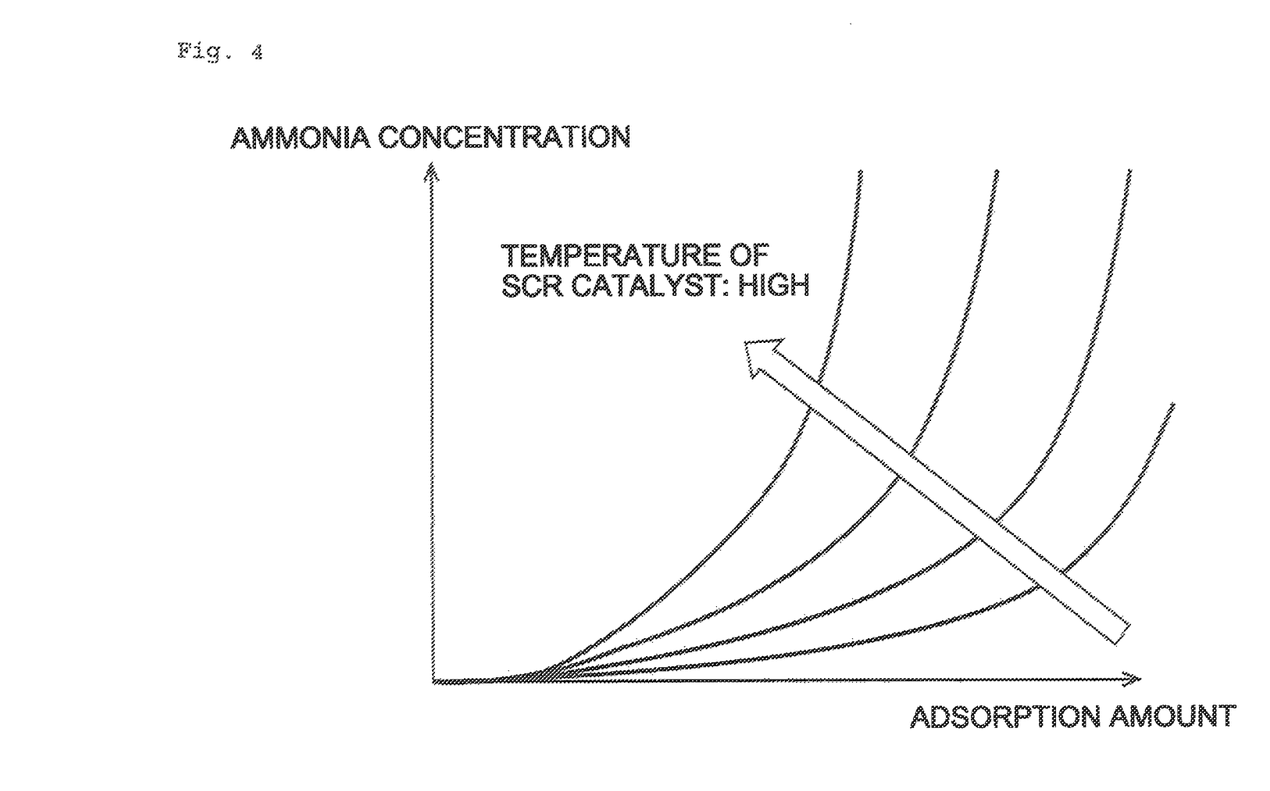
FIG. 4 is a diagram showing a relationship among an ammonia adsorption amount of an SCR catalyst, a temperature of the SCR catalyst, and a slip amount of ammonia.

FIG. 4 is a diagram showing a relationship among an amount (adsorption amount) of ammonia being adsorbed by an SCR catalyst, a temperature of the SCR catalyst, and an ammonia concentration of exhaust gas flowing out from the SCR catalyst in a case where a flow rate of exhaust gas passing through the SCR catalyst is constant. In FIG. 4, the ammonia concentration of exhaust gas flowing out from the SCR catalyst becomes higher as the ammonia adsorption amount by the SCR catalyst increases and becomes higher as the temperature of the SCR catalyst rises. Therefore, it could be said that, when the flow rate of exhaust gas passing through the SCR catalyst is constant, the ammonia slip amount increases as the ammonia adsorption amount by the SCR catalyst increases and as the temperature of the SCR catalyst rises.

In addition, when the ammonia concentration of exhaust gas flowing out from the SCR catalyst is constant, the larger the flow rate of exhaust gas passing through the SCR catalyst per unit time, the larger the slip amount per unit time. Therefore, the ammonia slip amount increases as the flow rate of exhaust gas passing through the SCR catalyst per unit time increases.

In consideration thereof, in the present embodiment, ammonia concentration of exhaust gas flowing out from the SCR catalyst is obtained based on a relationship such as that shown in FIG. 4, and the ammonia slip amount Anh3slp is obtained by multiplying the ammonia concentration by an exhaust flow rate per unit time (a sum of an intake air amount per unit time and a fuel injection amount per unit time).

Moreover, the ammonia adsorption amount used when obtaining the ammonia slip amount Anh3slp is estimated by an appropriate method. For example, the ammonia adsorption amount is obtained by subtracting an amount of ammonia consumed at the SCR catalyst (an amount of ammonia consumed to reduce $NO_x$) and a slip amount from an amount of ammonia flowing into the SCR catalyst.

Figure 5:
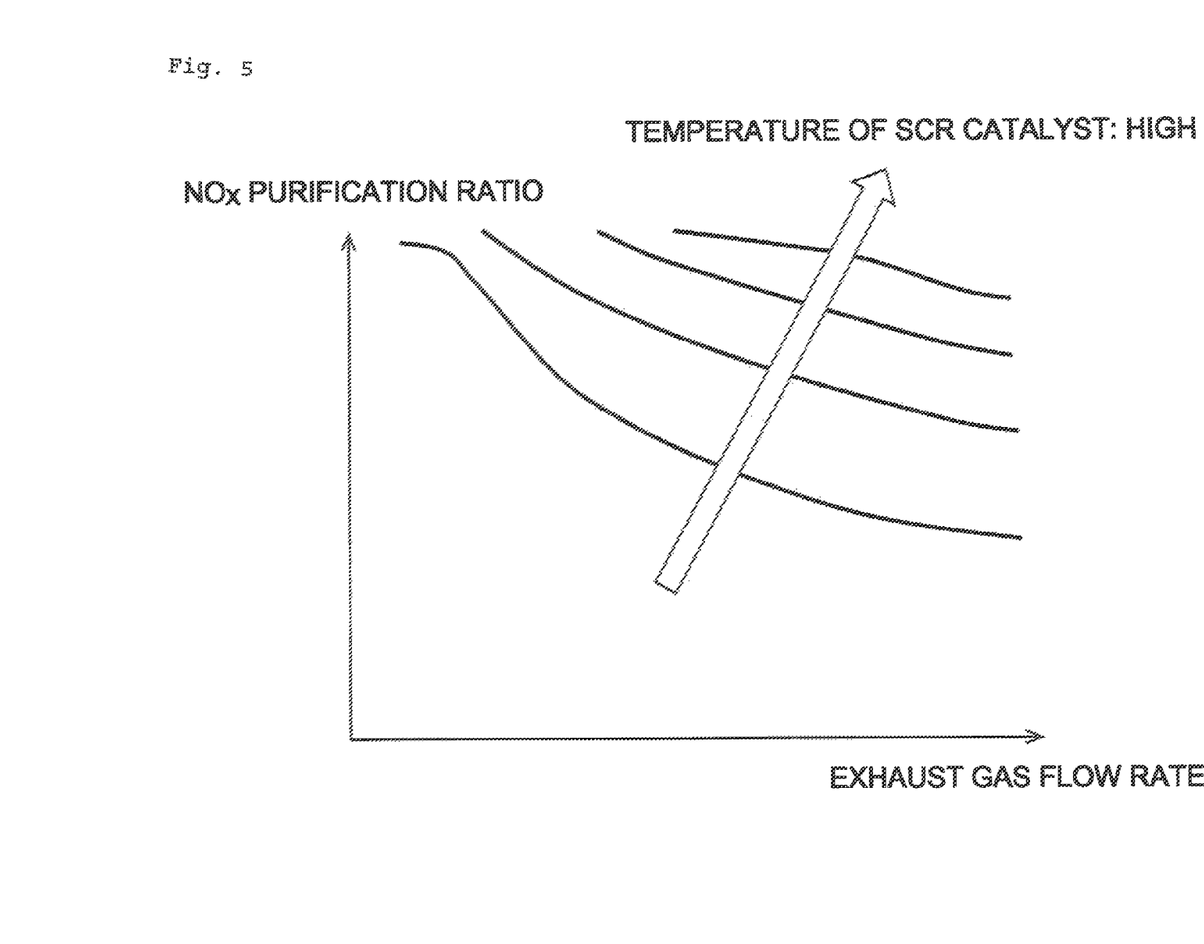
FIG. 5 is a diagram showing a relationship among a flow rate of exhaust gas that passes through an SCR catalyst, a temperature of the SCR catalyst, and a $NO_x$ purification ratio.

The amount of ammonia consumed at the SCR catalyst is calculated using a $NO_x$ inflow amount and a $NO_x$ purification ratio as parameters. The $NO_x$ inflow amount calculated value described earlier is used as the $NO_x$ inflow amount at this point. In addition, while the $NO_x$ purification ratio may be obtained by a similar method to the $NO_x$ purification ratio used in an abnormality diagnosing process of the exhaust gas purification apparatus, the $NO_x$ purification ratio may be estimated using a flow rate of exhaust gas flowing into the SCR catalyst (a sum of an intake air amount per unit time and a fuel injection amount per unit time) and a temperature of the SCR catalyst as parameters. For example, the $NO_x$ purification ratio used to calculate ammonia consumption may be estimated based on a relationship such as that shown in FIG. 5. FIG. 5 is a diagram showing a relationship among a flow rate of exhaust gas (a sum of an intake air amount per unit time and a fuel injection amount per unit time), a temperature of the SCR catalyst, and a $NO_x$ purification ratio. The $NO_x$ purification ratio tends to decrease as the exhaust flow rate increases and to increase as the temperature of the SCR catalyst rises (however, when the temperature of the SCR catalyst exceeds an upper limit temperature (for example, 350° C.), the $NO_x$ purification ratio decreases as the temperature of the SCR catalyst rises). Therefore, a map or a function defining a relationship such as that shown in FIG. 5 may be obtained in advance and the $NO_x$ purification ratio may be obtained based on the map or the function.

The calculating process of an ammonia adsorption amount described above is assumed to be started before the start of recirculation of EGR gas after startup of the internal combustion engine 1 and subsequently repetitively executed at a prescribed cycle. In addition, a value obtained in an immediately preceding calculating process (previous value) is assumed to be used as the ammonia adsorption amount used to calculate the ammonia slip amount Anh3slp.

In a process of S104, the ECU 10 determines whether or not the ammonia slip amount Anh3slp obtained by the process of S103 described above is equal to or larger than a prescribed amount α. The prescribed amount α in this case refers to a minimum value of a slip amount of ammonia which conceivably causes an incorrect diagnosis and is a value obtained in advance by a conformity process using an experiment or the like. When a negative determination is made in the process of S104, the ECU 10 temporarily ends processing of the present routine. On the other hand, when a positive determination is made in the process of S104, the ECU 10 proceeds to a process of S105.

In the process of S105, the ECU 10 calculates an increment ΔAnoxin of the $NO_x$ inflow amount attributable to ammonia sucked into the internal combustion engine 1 together with EGR gas. First, the ECU 10 calculates an amount of ammonia that is sucked into the internal combustion engine 1 together with EGR gas using the ammonia slip amount Anh3slp calculated in S103 described earlier and a proportion of an EGR gas amount with respect to a flow rate of exhaust gets. In this case, the proportion of an EGR gas amount with respect to a flow rate of exhaust gas can be calculated based on an EGR ratio and an output signal (intake air amount) of the air flowmeter 11. Next, the ECU 10 calculates an amount of $NO_x$ created when assuming that all of the ammonia that is sucked into the internal combustion engine 1 together with EGR gas is to be oxidised (the increment ΔAnoxin of the $NO_x$ inflow amount).

In a process of S106, the ECU 10 calculates a time required until the increment ΔAnoxin in $NO_x$ flows into the SCR catalyst. In other words, the ECU 10 calculates a time (transport lag time) required by a part of exhaust gas having flowed out from the second catalyst casing 7 to once again flow into the second catalyst casing 7 via the EGR passage 90, the intake passage 2, and the internal combustion engine 1. The transport lag time can be calculated using a length of a pathway traveled by a part of exhaust gas having flowed out from the second catalyst casing 7 until once again flowing into the second catalyst casing 7, a capacity of the pathway, and a flow speed of exhaust gas (an intake air amount per unit time) as parameters. For example, the longer the length of the pathway, the longer the transport lag time. The larger the capacity of the pathway, the longer the transport lag time. The slower the flow speed of exhaust gas, the longer the transport lag time. Moreover, since the length of the pathway and the capacity of the pathway are fixed values, a map or a function representing a relationship between the flow speed of exhaust gas and the transport lag time may be obtained in advance and the transport lag time may be obtained based on the map or the function. In this case, since the length of the pathway and the capacity of the pathway differ according to specifications of the internal combustion engine, a type of vehicle to which the internal combustion engine is mounted, or the like, a map or a function conforming to the specifications of the internal combustion engine, the type of vehicle, or the like is desirably created in advance.

In a process of S107, the ECU 10 determines whether or not the transport lag time obtained in the process of S106 has elapsed. When a negative determination is made in the process of S107, the ECU 10 repetitively executes the process of S107. On the other hand, when a positive determination is made in the process of S107, the ECU 10 proceeds to a process of S108.

In the process of S108, the ECU 10 corrects the $NO_x$ inflow amount calculated value Anoxin using the increment ΔAnoxin obtained in the process of S105. In other words, the ECU 10 adds up the $NO_x$ inflow amount calculated value Anoxin and the increment ΔAnoxin to calculate a $NO_x$ inflow amount Anoxinr corresponding to the actual $NO_x$ inflow amount.

The correcting means according to the present invention is realized as the ECU 10 executes the processing routine shown in FIG. 3 as described above. As a result, when a part of ammonia having slipped through the SCR catalyst is introduced into the internal combustion engine 1 by the EGR apparatus 9, an error between the actual $NO_x$ inflow amount and the $NO_x$ inflow amount calculated value can be reduced. In addition, by calculating the $NO_x$ purification ratio using the $NO_x$ inflow amount calculated value after correction, since a more accurate $NO_x$ purification ratio can be obtained, abnormality diagnostic accuracy of the SCR catalyst can be improved. Furthermore, by adjusting an injection amount of the urea water supply using the $NO_x$ inflow amount calculated value after correction as a parameter (corresponds to the changing means according to the present invention), ammonia can be supplied to the SCR catalyst in an amount suitable to the actual $NO_x$ inflow amount and an amount of ammonia not purified by the SCR catalyst can be suppressed to a low level.

Therefore, with the abnormality diagnosis apparatus of an exhaust gas purification apparatus according to the present embodiment, when a part of ammonia is introduced into the internal combustion engine 1 by the EGR apparatus 9, an incorrect diagnosis that an abnormality of the SCR catalyst has occurred even though an abnormality of the SCR catalyst has not occurred can be prevented from being made.

As a result, accuracy of an abnormality diagnosing process of an SCR catalyst can be improved.

Moreover, in the example shown in FIG. 3, the $NO_x$ inflow amount calculated value is corrected on the condition that the adding valve 8 is injecting the urea aqueous solution, the EGR apparatus 9 is operating, and a slip amount of ammonia is equal to or larger than the prescribed amount α. Alternatively, the $NO_x$ inflow amount calculated, value may be corrected even when the adding valve 8 is not injecting a urea aqueous solution if the EGR apparatus 9 is operating and the slip amount of ammonia is equal to or larger than the prescribed amount α. This is particularly valid when a temperature of the SCR catalyst is high. In other words, when the temperature of the SCR catalyst rises, since ammonia having been adsorbed by the SCR catalyst is desorbed from the SCR catalyst, an amount of ammonia that flows out from the SCR catalyst may possibly exceed the prescribed amount α. Therefore, even if the adding valve 8 is not injecting a urea aqueous solution, when a temperature of the SCR catalyst is within a temperature range that promotes desorption of ammonia, the $NO_x$ inflow amount calculated value may be corrected based on an amount of ammonia that flows out from the SCR catalyst.

In addition, once an abnormality diagnosis of the SCR catalyst is performed accurately, an abnormality diagnosing process of a urea aqueous solution can also be executed more accurately. The "abnormality diagnosing process of a urea aqueous solution" in this case refers to a process for diagnosing whether or not a concentration of urea contained in the urea aqueous solution is lower than a lower limit value. When the concentration of urea contained in the urea aqueous solution becomes excessively low, an amount of ammonia supplied to the SCR catalyst may become excessively small and an amount of $NO_x$ that is not purified by the SCR catalyst may become excessively large. In addition, when feedback control of an injection amount of the urea aqueous solution is performed based on a difference between a $NO_x$ purification ratio of the SCR catalyst and a target value, the injection amount of the urea aqueous solution may become excessively large and consumption of the urea aqueous solution may become excessively large.

To address such problems, an abnormality of the urea aqueous solution is diagnosed using a $NO_x$ purification ratio when the injection amount of the urea aqueous solution is set larger than the target value as a parameter. For example, when the concentration of urea contained in the urea aqueous solution is equal to or higher than a lower limit value, a slip amount of ammonia increases. In this case, the $NO_x$ sensor 12 characteristically reacts to ammonia in addition to $NO_x$ in exhaust gas. Therefore, when the slip amount of ammonia increases, the output signal from the $NO_x$ sensor 12 also increases. When the output signal from the $NO_x$ sensor 12 increases, the $NO_x$ purification ratio Enox that can be obtained by Expression (1) above declines.

On the other hand, when the concentration of urea contained in the urea aqueous solution is lower than the lower limit value, the slip amount of ammonia hardly increases and an ammonia adsorption amount by the SCR catalyst increases. As a result, the output signal of the $NO_x$ sensor 12 either remains unchanged or decreases. Consequently, the $NO_x$ purification ratio Enox that can be obtained by Expression (1) above either hardly changes or increases.

Therefore, an abnormality of the urea aqueous solution can be more accurately diagnosed by executing an abnormality diagnosing process of the urea aqueous solution when a diagnosis that an abnormality of the SCR catalyst has not occurred is made in an abnormality diagnosing process of the SCR catalyst.

When an abnormality diagnosing process of the urea aqueous solution is executed by the method described above, since an amount of ammonia flowing out from the SCR catalyst increases when an abnormality of the urea aqueous solution has not occurred, there is a possibility that a relatively large amount of ammonia may be accordingly discharged into the atmosphere. In consideration thereof, the abnormality diagnosis apparatus of the exhaust gas purification apparatus according to the present embodiment is configured to operate the EGR apparatus 9 (open the EGR valve 91) when executing an abnormality diagnosing process of the urea aqueous solution in a non-operating state of the EGR apparatus 9 or to increase the EGR ratio when executing an abnormality diagnosing process of the urea aqueous solution in an operating state of the EGR apparatus 9. According to such a method, an abnormality diagnosing process of the urea aqueous solution can be executed while reducing an amount of ammonia that is discharged to the atmosphere.

Figure 6:
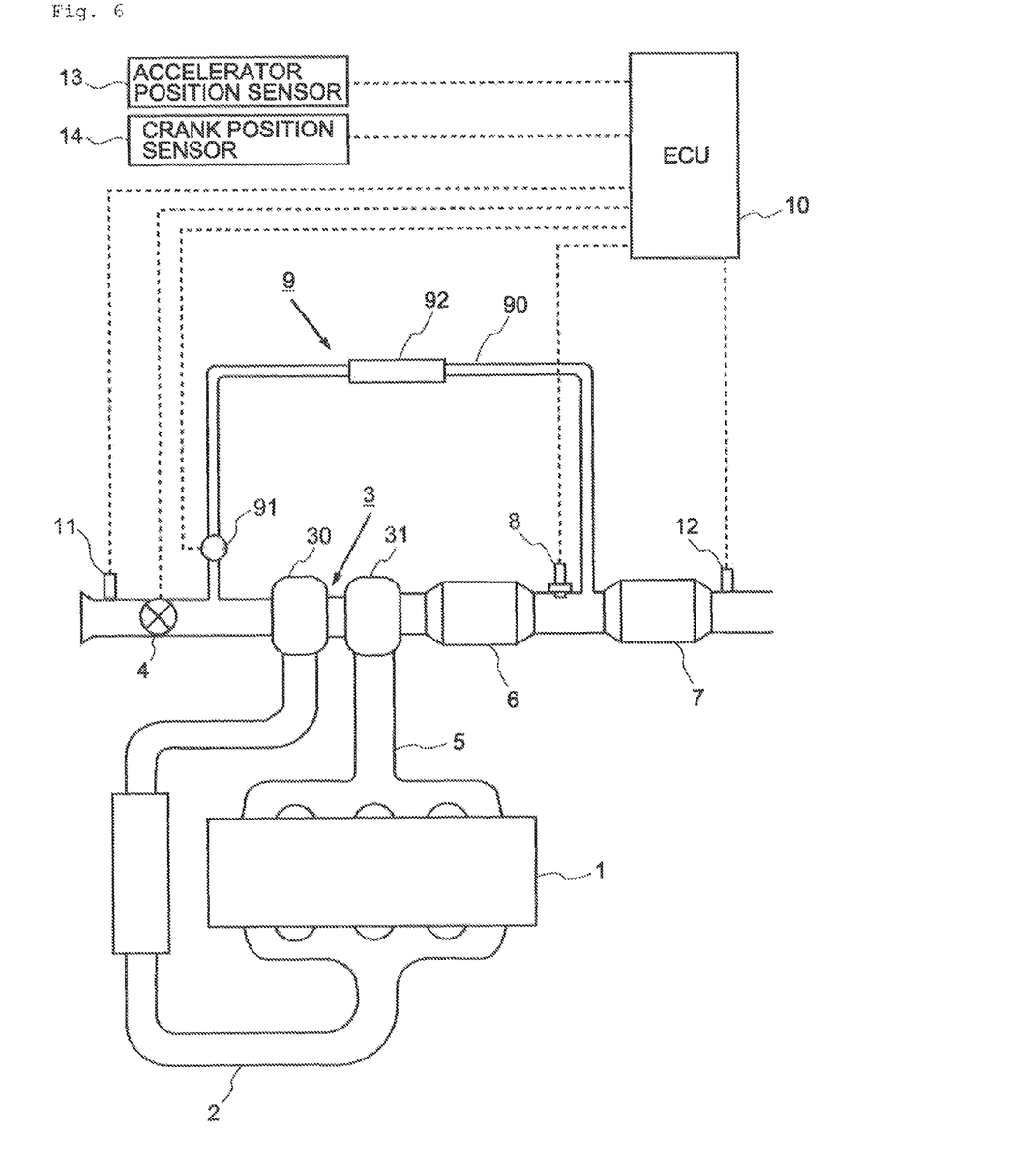
FIG. 6 is a diagram showing another configuration example of an internal combustion engine and an intake and exhaust system thereof to which the present invention is applied.

Moreover, while an example in which a base end (upstream side end) of the EGR passage 90 is connected to the exhaust passage 5 on a downstream side of the second catalyst casing 7 has been described in the present embodiment, alternatively, the base end of the EGR passage 90 may be connected to the exhaust passage 5 between the adding valve 8 and the second catalyst casing 7 as shown in FIG. 6. In this case, when the adding valve 8 is injecting a urea aqueous solution and the EGR apparatus 9 is operating, the increment ΔAnoxin of the $NO_x$ inflow amount may be calculated using an amount of the urea aqueous solution injected from the adding valve 8, a proportion of an EGR gas amount with respect to a flow rate of exhaust gas, and a transport lag time as parameters.

EXPLANATION OF REFERENCE NUMERALS AND CHARACTERS 1 internal combustion engine
2 intake passage
3 turbocharger
4 intake throttle valve
5 exhaust passage
6 first catalyst casing
7 second catalyst casing (exhaust gas purification apparatus)
8 adding valve
9 EGR apparatus
10 ECU
11 air flow meter
12 $NO_x$ sensor
13 accelerator position sensor
14 crank position sensor
30 compressor
31 turbine
90 EGR passage
91 EGR valve
92 EGR cooler

The invention claimed is:

1. An abnormality diagnosis apparatus of an exhaust gas purification apparatus, comprising:
an exhaust gas purification apparatus which is arranged in an exhaust passage of an internal combustion engine and which includes a selective catalytic reduction catalyst;
a supply apparatus which supplies an additive that is ammonia or an ammonia precursor to the exhaust gas purification apparatus;
an EGR apparatus which recirculates a part of exhaust gas from the exhaust passage at a downstream side of a position of supplying the additive by the supply apparatus to an intake passage; and
an electronic control unit comprising at least one processor configured to:
calculate a $NO_x$ inflow amount that is an amount of $NO_x$ that flows into the exhaust gas purification apparatus using a parameter indicating an operating state of the internal combustion engine;
diagnose an abnormality in the exhaust gas purification apparatus using the calculated $NO_x$ inflow amount; and
when a part of the exhaust gas is recirculated by the EGR apparatus, increasingly correct the calculated $NO_x$ inflow amount in accordance with an amount of the additive to be recirculated together with exhaust gas.

2. The abnormality diagnosis apparatus of an exhaust gas purification apparatus according to claim 1, wherein
the EGR apparatus recirculates a part of exhaust gas from the exhaust passage at a downstream side of the exhaust gas purification apparatus to the intake passage, and
the at least one processor is configured to increasingly correct, when a part of exhaust gas is recirculated by the EGR apparatus and the additive flows out from the exhaust gas purification apparatus, the calculated $NO_x$ inflow amount in accordance with an amount of the additive that is recirculated together with exhaust gas.

3. The abnormality diagnosis apparatus of an exhaust gas purification apparatus according claim 2, wherein the at least one processor is configured to calculate an amount of the additive that is recirculated together with exhaust gas using, as parameters, an amount of the additive that flows out from the exhaust gas purification apparatus, a proportion of an amount of exhaust gas that is recirculated by the EGR apparatus with respect to an amount of exhaust gas that is flowed out from the exhaust gas purification apparatus, and a time required for a part of the exhaust gas flowed out from the exhaust gas purification apparatus to once again flow into the exhaust gas purification apparatus via the intake passage and the internal combustion engine, and increase a correction amount when increasingly correcting the calculated $NO_x$ inflow amount in a case where the calculated amount of the additive is large as compared to a case where the calculated amount of the additive is small.

4. The abnormality diagnosis apparatus of an exhaust gas purification apparatus according to claim 1, wherein the at least one processor is configured to change an amount of the additive supplied from the supply apparatus in accordance with correction amount for increasingly correcting the calculated $NO_x$ inflow amount.

* * * * *